US011911332B2

(12) United States Patent
Neuman et al.

(10) Patent No.: US 11,911,332 B2
(45) Date of Patent: Feb. 27, 2024

(54) PASSIVE SPINE ELONGATION DEVICE

(71) Applicants: David T. Neuman, New York, NY (US); Roberto Gil, Brooklyn, NY (US)

(72) Inventors: David T. Neuman, New York, NY (US); Roberto Gil, Brooklyn, NY (US)

(73) Assignee: ERGONOMANIA, LLC, New York, NY (US)

( * ) Notice: Subject to any disclaimer, the term of this patent is extended or adjusted under 35 U.S.C. 154(b) by 361 days.

(21) Appl. No.: 16/906,114

(22) Filed: Jun. 19, 2020

(65) Prior Publication Data

US 2020/0405565 A1 Dec. 31, 2020

Related U.S. Application Data

(60) Provisional application No. 62/866,818, filed on Jun. 26, 2019.

(51) Int. Cl.
*A61H 1/00* (2006.01)
*A61H 1/02* (2006.01)

(52) U.S. Cl.
CPC ......... *A61H 1/0292* (2013.01); *A61H 1/0218* (2013.01); *A61H 2203/0468* (2013.01)

(58) Field of Classification Search
CPC .. A61H 1/0292; A61H 1/0218; A61H 1/0222; A61H 1/02; A61H 1/0229; A61H 2203/0468; A61H 2203/0412
USPC .......................................................... 606/241
See application file for complete search history.

(56) References Cited

U.S. PATENT DOCUMENTS

| | | | | |
|---|---|---|---|---|
| 1,242,598 A * | 10/1917 | Riddle | A61H 1/0218 | 5/613 |
| 2,764,150 A * | 9/1956 | Ettinger | A61G 13/0054 | 5/630 |
| 2,887,151 A * | 5/1959 | Springer | A61G 13/00 | 297/423.39 |
| 3,493,225 A * | 2/1970 | Ceraldi | A61G 13/00 | 5/624 |
| 4,170,986 A * | 10/1979 | Hinshaw | A61H 1/00 | 211/198 |
| 4,432,108 A * | 2/1984 | Chapman | A61H 1/0292 | 5/648 |
| 4,550,901 A * | 11/1985 | Muchisky | A61G 7/0755 | 5/648 |
| 5,718,722 A * | 2/1998 | Kiefer | A61H 1/0292 | 219/217 |
| 6,468,192 B1 * | 10/2002 | Doerscheln | A61H 1/0292 | 482/142 |
| 7,669,262 B2 * | 3/2010 | Skripps | A61G 13/12 | 5/624 |

* cited by examiner

*Primary Examiner* — Adam Baker
(74) *Attorney, Agent, or Firm* — Tutunjian & Bitetto, P.C.

(57) ABSTRACT

A passive spine elongation device has a front portion and a rear portion pivotally connected to the front leg portion. An adjustment device connected to the front portion and the rear portion allows the distance between the front and leg portions to be adjusted, thereby allowing a variable apex angle and adjustable height of the same. The front portion includes a head support, a torso support and a pelvic/hip support. The rear portion includes a leg support. The head support is spaced from the torso support, while the torso support is also spaced from the pelvic/hip support.

11 Claims, 5 Drawing Sheets

PASSIVE SPINE ELONGATION DEVICE

BACKGROUND

Technical Field

The present invention relates to spine health. More particularly, it relates to a device for passively elongating the spine and providing a form of spinal traction to alleviate spasms and tightness around the middle and lower back muscles, soft tissues and joints.

Description of Related Art

The neck and lower back pain and dysfunction can arise due to trauma, fatigue, or overuse, or can be part of the natural aging process. Traction can be often used to treat these pains. Traction causes controlled spinal column elongation and leads to a separation of the joints around the upper, middle and lower spine. Active traction devices affix to the patient and literally pull on or stretch their torso or neck to achieve the desired elongation. Passive traction devices rely on gravity and generally require the user to hang upside down, and as such are not only difficult to use, but difficult to get in and out of.

SUMMARY

The present invention seeks to provide a prone-positioned passive spine elongation/traction device that is simple to use, is adjustable to accommodate different size users, and is foldable for storage purposes.

This any other aspects of the invention are achieved by a passive spine elongation device having a front portion, a rear portion pivotally connected to the front portion, and an apex formed above the point of pivotal connection of the front portion and rear portion. The front portion having opposing legs, a pelvic support encompassing the apex, a torso support and a head support positioned between the opposing legs. The pelvic support and the torso support are separated by a space.

According to another aspect of the invention, the passive spine elongation device includes a front portion, a rear portion and an adjustment device. The front portion includes opposing front legs, a pelvic support, a torso support and a head support positioned between the opposing legs. The pelvic support and the torso support are being separated by a space. The torso support being separated from the head support by another space. The rear portion includes opposing rear legs pivotally connected to the front portion and a leg support connecting the opposing rear legs. The Adjustment device has one end connected to the front portion and an opposing end connected to the rear portion. The adjustment device is configured to control and limit the pivotal movement of the front legs with respect to the rear legs such that a predetermined apex angle (B) is formed between the front legs and the rear legs.

According to one implementation, the predetermined apex angle includes an angle in a range of 80-100 degrees.

According to another implementation, adjusting a length of the adjustment device adjusts a distance between the front portion and the rear portion, and thereby adjusts a height of the apex and the predetermined apex angle.

These and other aspects and features of the present principles will become apparent from the following detailed description considered in conjunction with the accompanying drawings. It is to be understood, however, that the drawings are designed solely for purposes of illustration and not as a definition of the limits of the present principles, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views.

DETAILED DESCRIPTION

"Passive" as used herein refers to the state of the muscles around the lumbar spine. Passive muscles are those at rest and soft, and therefore not engaged or activated. The passive lumbar spine elongation device 10 of the present invention is designed to be used to alleviate spasms and tightness around the middle and lower back muscles and soft tissues, and the pain associated with the bone and soft tissue changes of an aging and degenerating spine (osteoarthritis). The middle and lower back pain and dysfunction can arise due to trauma, fatigue, or overuse, or can be part of the natural aging process. The lumbar spine elongation device of the present invention is uniquely designed to be used in a prone (face-down) position of the body and creates gentle, controlled traction along the area of involvement, using gravity, comfortable contact points and the weight of the both the lower body and the upper body. Traction causes slight spinal column elongation and leads to stretching of the soft tissues and separation of the joints around the middle and lower spine. The "passive" elongation provided by the spine elongation device of the invention, helps stretch muscles around the spine, and gently pulls and lengthens the ligaments around the spine. In addition, this passive traction alleviates the pain and mechanical irritation of disc bulges and disc herniations. The prone (face-down) position of the body uses gravity to help alleviate the pressure of bulging discs or herniated discs on the spinal canal and nerves.

Figure 1:
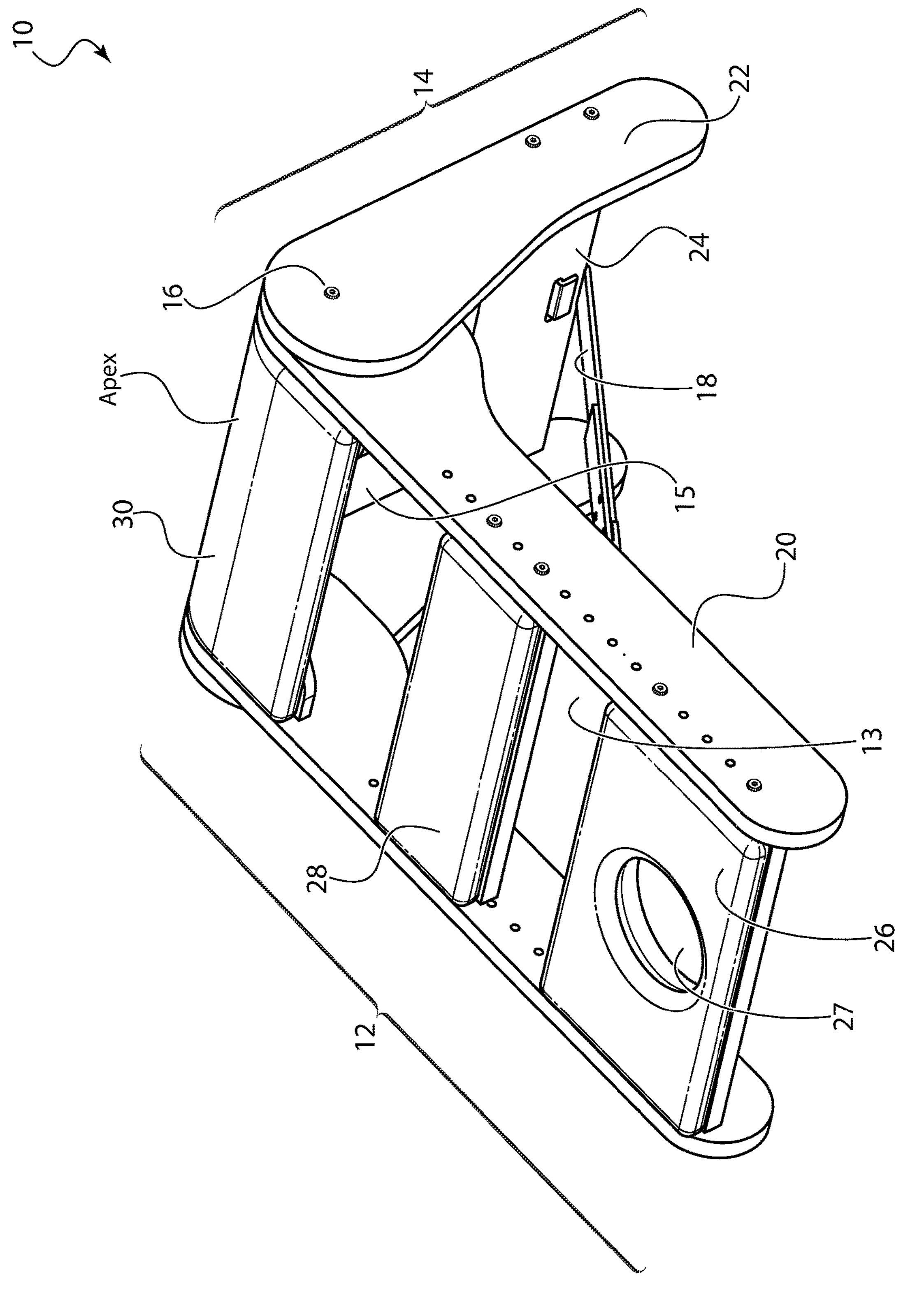
FIG. 1 is a perspective view of the spine elongation device according an embodiment of the invention.

FIG. 1 shows the passive spine elongation device 10 according to an embodiment of the invention. The device 10 includes a front portion 12 and a rear portion 14. The front portion 12 is made up of opposing front legs 20 connected to each other with a head support 26, a torso support 28 and an apex, pelvic or hip support 30. The pelvic (or hip) support 30 is curved and encompasses or includes the "apex" or highest point of the device (discussed in more detail later as it relates to operation). The spacing 13 between the head support 26 and torso support 28, and the spacing 15 between the torso support 28 and the pelvic support 30 are adjustable and allow for point of body contact and comfort adjustments of the device. For example, the spacing 15 is designed to receive the user's stomach/gut area such that their spine remains straight to achieve the desired elongation/traction. As will be appreciated, the spacings 13 and 15 can be changed according to the size of the user.

The rear portion 14 consists of opposing rear legs 22 pivotally connected to the front legs at a pivot hinge point 16 and connected to each other with a leg support 24. The pivot hinge 16 allows the rear legs 22 to be folded toward and away from the front legs 20 (see, FIG. 2C). As will be described in more detail in FIG. 2B, a device 18 is configured to adjust, and ultimately limit, the pivotal movement of the front legs 20 with respect to the rear legs 22, such that a predefined apex angle B is achieved. In one embodiment, device 18 can be a strap or the like and configured to connect the leg support 24 with the head support 26 on the underside of the device. Once adjusted to the desired length, the device 18 will maintain the spine elongation device 10 in a desired operating position.

In accordance with a preferred implementation, the legs 20, 22 and the supports 24, 26, 28 and 30 are made of a rigid material. An example of such a rigid material could be wood. Alternatively, the rigid material can be any suitable rigid material strong enough for this application. For example, various metals, metal alloys and/or plastics could be used for the legs 20, 22, and supports 24, 26, 28 and 30 without departing from the intended scope of the invention.

Figure 2A:
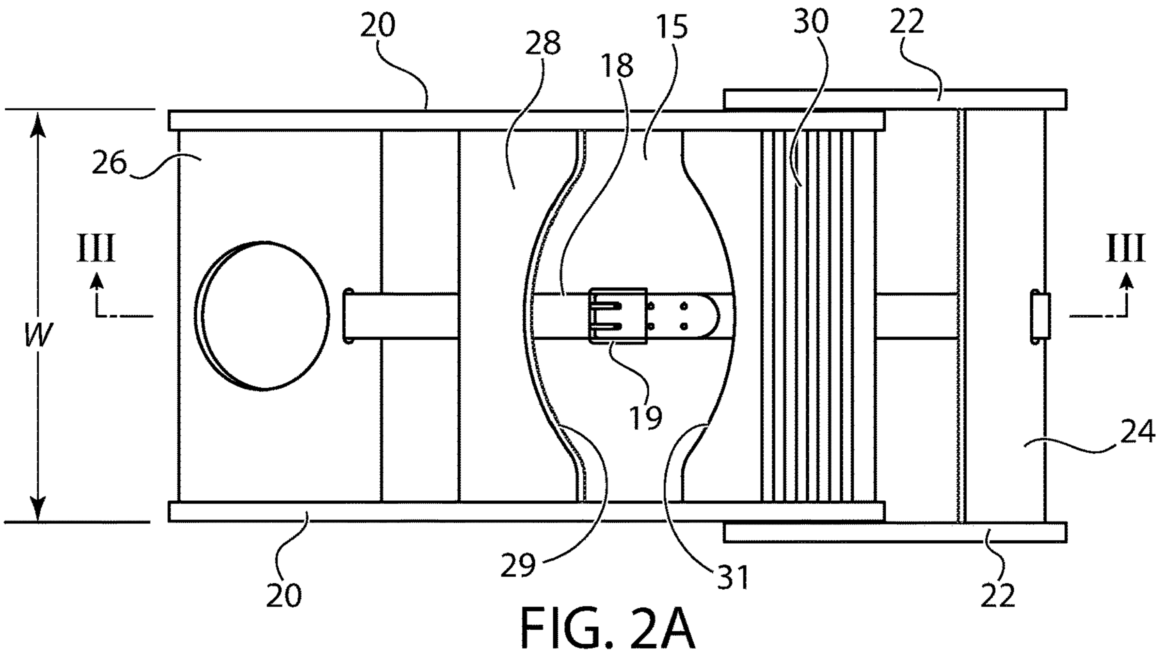
FIG. 2A is a top view of the spine elongation device according to another embodiment of the invention.
Figure 2B:
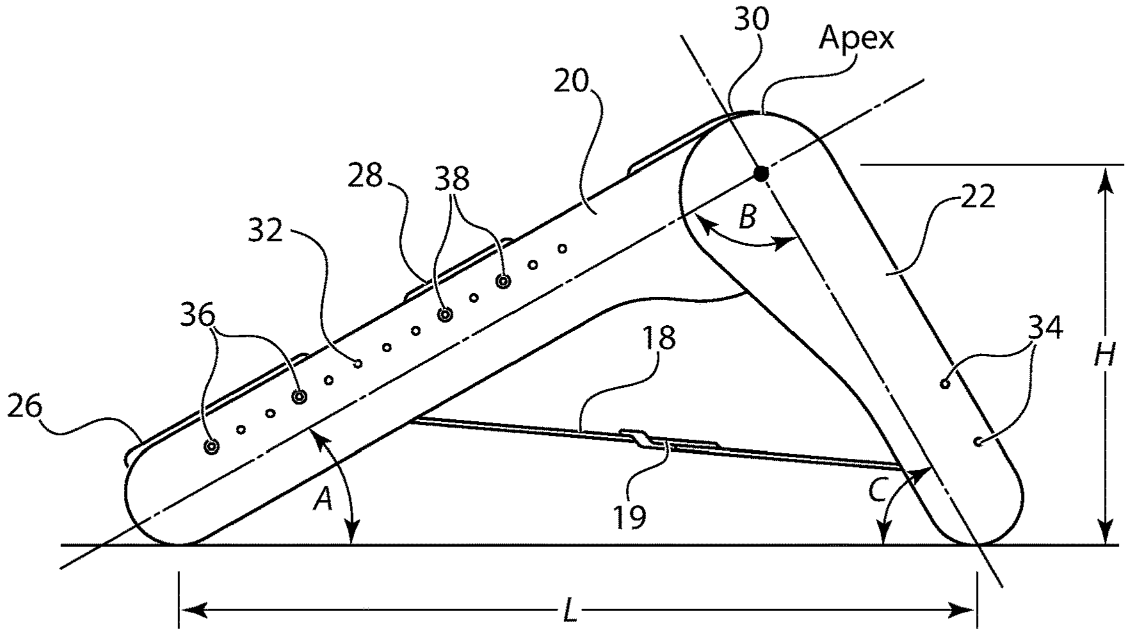
FIG. 2B is a side view of the spine elongation device according to another embodiment of the invention.

FIG. 2A shows a top view of the spine elongation device 10 according to another embodiment of the invention. As shown, the opposing front legs 20 are connected to each other via head support 26, torso support 28 and pelvic support 30, while rear legs 22 are connected to each other via leg support 24. In this figure. support surfaces 24, 26, 28 and 20 are shown as boards or planks without any cushioning on the same. As will be discussed in later embodiments, these supports can include padding or cushioning to provide comfort to the user during use. In this embodiment, the strap device 18 connects the rear leg support 24 to the head support 26 and through the adjustable length of the same can dictate the length L between ground contact points or the front legs 20 and rear legs 22, and thus will also allow the user to change the height H of the pelvic support 30 (FIG. 2B). Although shown as a belt like adjustment 19, strap 18 can have any type of known adjustment that is easy to use and which is secure once locked. Other examples of such adjustments could include plastic strap locks, cinch cams, ratcheting strap locks, and/or hook and loop fasteners. Other less mobile implementations could use rigid rods of predetermined lengths that removably connect to the front and rear legs at designated points of connection (e.g., on internal or external surfaces of the legs).

In the embodiment of FIG. 2A, the torso support 28 and the pelvic support 30 are shown with additional arcuate cutouts 29 and 31, respectively. As described above, the spacing 15 between these two supports can be modified to accommodate the stomach/gut of the user. Here, these additional cutouts 29, 31 show how the spacing 15 can be increased without necessarily moving the supports themselves. In accordance with other embodiments, the position of the torso support 28 and/or the head support 26 can be moved up or down to accommodate the user's body and positioning on the same.

As shown in the side view of FIG. 2B, the front legs 20 includes a plurality of adjustment holes 32. The adjustment holes 32 are used to secure the head support 26 in place using fasteners 36, and the torso support 28 using fasteners 38. In one embodiment, fasteners 36 and 38 can be for example, screws, removable rods (of any desired material) or any other known support type rod that can be positioned though the hole 32 and into the respective support. In one embodiment, the supports 26 and 28 can be configured with receivers (not shown) that are threaded or the like, and that are positioned to align with the holes 32 and receive a threaded fastener. The leg support 24 is connected to the rear legs through holes 32 using fasteners 34. Although in the shown embodiment, rear legs 22 only includes two holes 32, it will be appreciated that multiple holes can be provided in the rear legs so as to provide adjustability in the positioning of the leg support 24 up or down depending on the size of the user.

Further referring to FIG. 2B, and as will be appreciated, when the spine elongation device is positioned on the ground, the front legs 20 form an angle A with the ground, the rear legs 22 form an angle C with the ground, and at the apex an angle B is formed between the front legs 22 and the rear legs 20. These angles A, B and C are dictated by the distance D between the front and rear legs as defined by the adjustment device 18. As mentioned above, the adjustment device 18 is adjustable in length using a buckle 19 or other strap adjustment means. The single adjustment of strap 18 will have the effect of varying the length L which will change the apex Angle B and also the height H of the pelvic support 30.

In a preferred embodiment, the apex angle B is ~95° but can be in a range of 80-100 degrees. The length L is also variable, and in one embodiment is approximately 38 inches. The width W of the spine elongation device can be in a range of 10-36 inches with the same being determined based on the size of the user. In a preferred implementation the width W is 19-20 inches. As will be appreciated, as the apex angle B is adjusted by changing the length of the adjustment device 18, so too will the angles A and C with respect to the front legs and rear legs, respectively be changed. Thus, since the spine elongation device of the present invention forms a triangle with the ground, when the apex angle B is in a range of 80-100 degrees, the combined total of angles A+C must therefore be in a range of 100-80 degrees (i.e., all angles in a triangle must add up to 180 degrees).

Figure 2C:
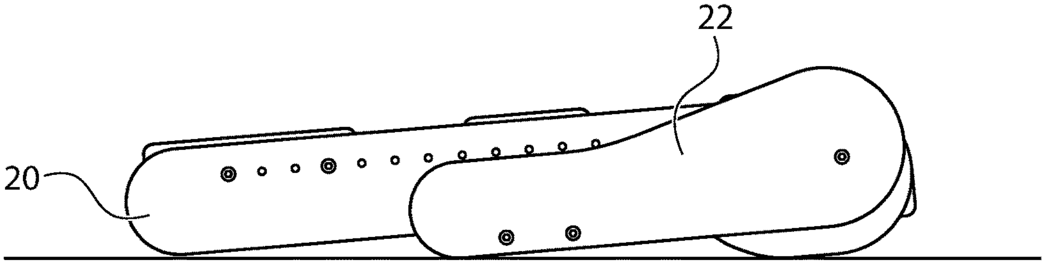
FIG. 2C is a side view of the spine elongation device in a folded position according to an embodiment of the invention.

FIG. 2C shows an example of the spine elongation device with the rear legs 22 folded in toward the front legs 20. In this folded position, the spine elongation device can be easily stored, for example by hanging, under a bed or in a closet.

Figure 3A:
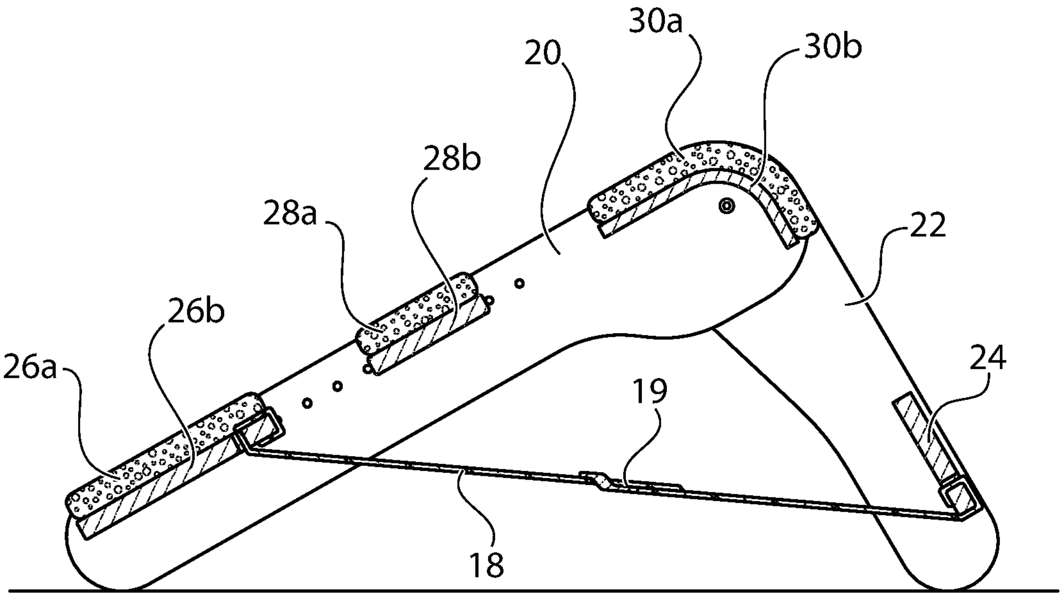
FIG. 3A is a cross-sectional view of the spine elongation device taken along lines III-III of FIG. 2A according to embodiment of the invention.
Figure 3B:
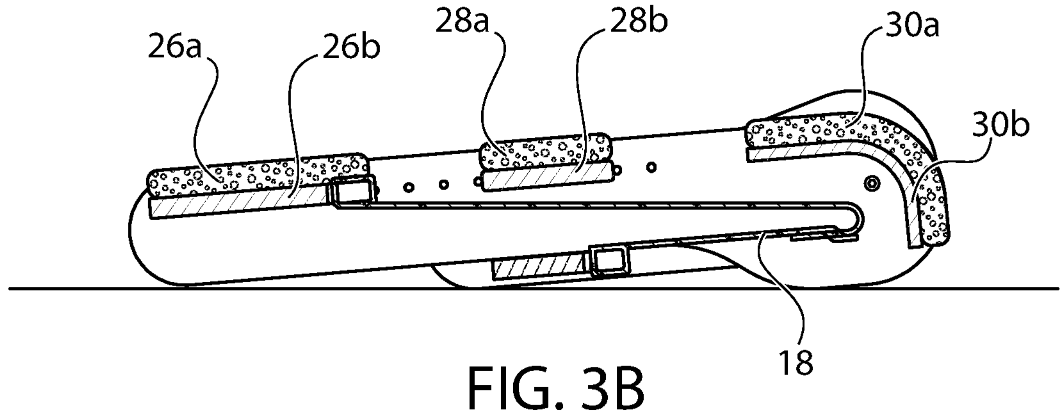
FIG. 3B shows is a side of the cross-sectional view of FIG. 3A showing the spine elongation device in the folded position according to another embodiment of the invention.

Referring to FIGS. 3A and 3B, there is shown cross sections of the spine elongation devices of FIGS. 2A and 2C, respectively. In this embodiment, it is shown that the head support 26 can include a rigid support 26B and a cushioned support 26A positioned on the rigid support 26B. The torso support 28 can include a rigid support 28B, and a cushioned support 28A positioned thereon. The pelvic/hip support 30 also has a rigid support 30B and a cushioned support 38A positioned thereon. Because most of the user's body (and therefore weight) will be positioned on and supported by the torso support 12, the leg support 24 does not require a cushioned support. However, in another embodiment, leg support 24 can include a cushioned support. Furthermore, as shown, in one implementation, the strap 18 can be fixedly secured at one end to the leg support 24, and at the other end to the head support 26. It will be appreciated that the positioning of strap 18 (apart from that shown in the drawings) can change and be fixedly secured to the front legs 20 and rear legs 22 in any suitable known manner. In other implementations, not shown, the adjustable point 19 of the strap 18 could be repositioned, for example, to be accessible from the rear leg support 24 side of the device or even on the side of the device (e.g., on the sides of the legs). In this manner, the user would not need to put the entire device on its side to adjust the strap length and could allow them to do it while the device is upright. FIG. 3B shows the device in cross section of FIG. 3A in a folded position.

Figure 4:
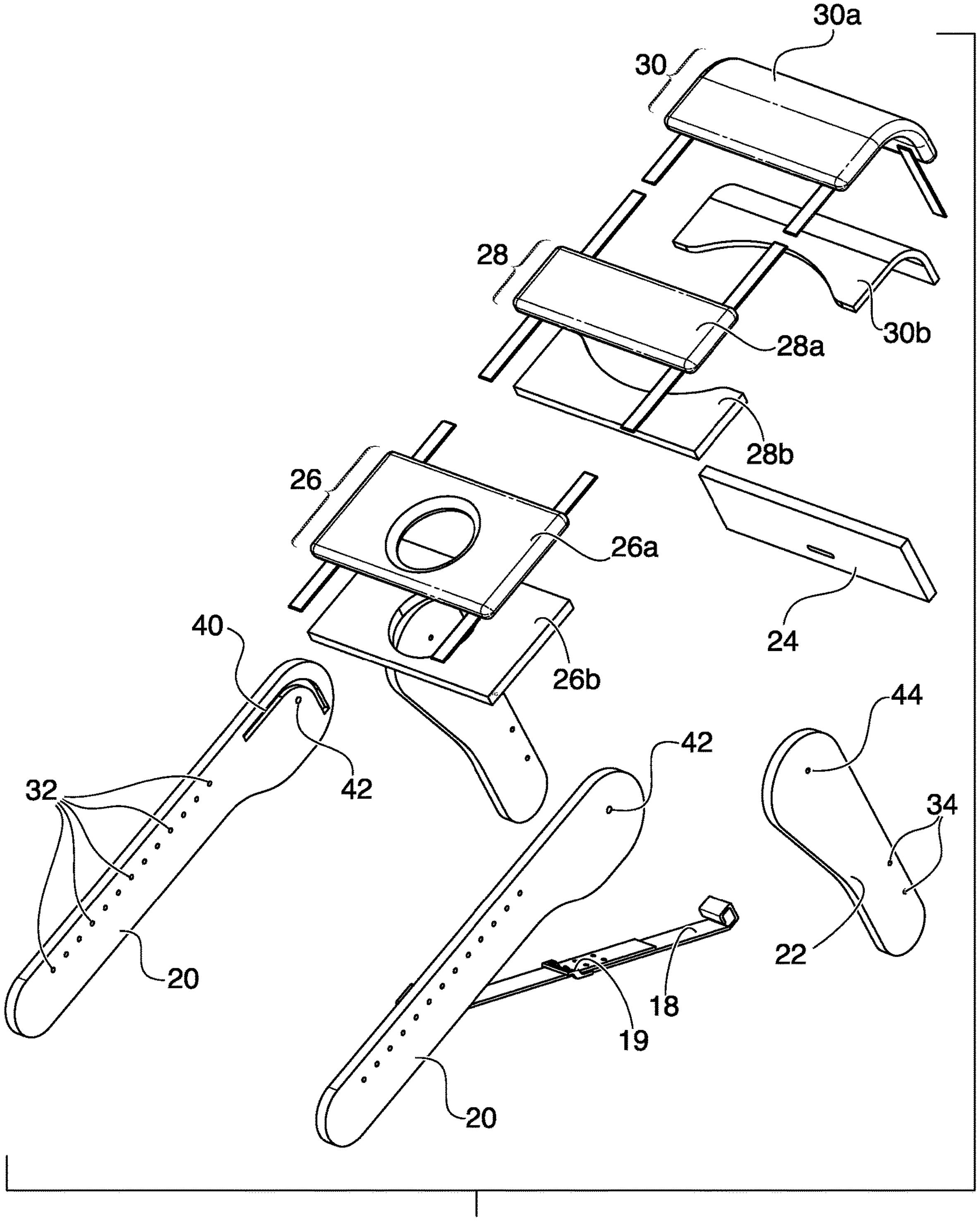
FIG. 4 shows an exploded perspective view of the spine elongation device according to a further embodiment of the invention.

FIG. 4 shows an exploded perspective view of the spine elongation device according to an embodiment of the invention. This view shows the assembly of the device, and more specifically, the positioning of the pelvic support 30 in the legs 20. As shown, in one embodiment, the inside surface of the legs 20 includes a slot or groove 40 that is specifically configured to receive the ends of the rigid pelvic support 30B. Once this support 30B is positioned in the slot/groove 40, and the torso support 28 and head support 28 are connected to the legs, the pelvic support 30 will remain in the fixed/desired position. Although this figure shows the cushions 26A, 28A and 30A being separately added to the underlying rigid supports 26B, 28B and 30*b*, respectively, it will be appreciated that the supports 26, 28 and 30 can be integrally formed with cushion materials such that the user does not have to adjust or deal with the same.

Figure 5:
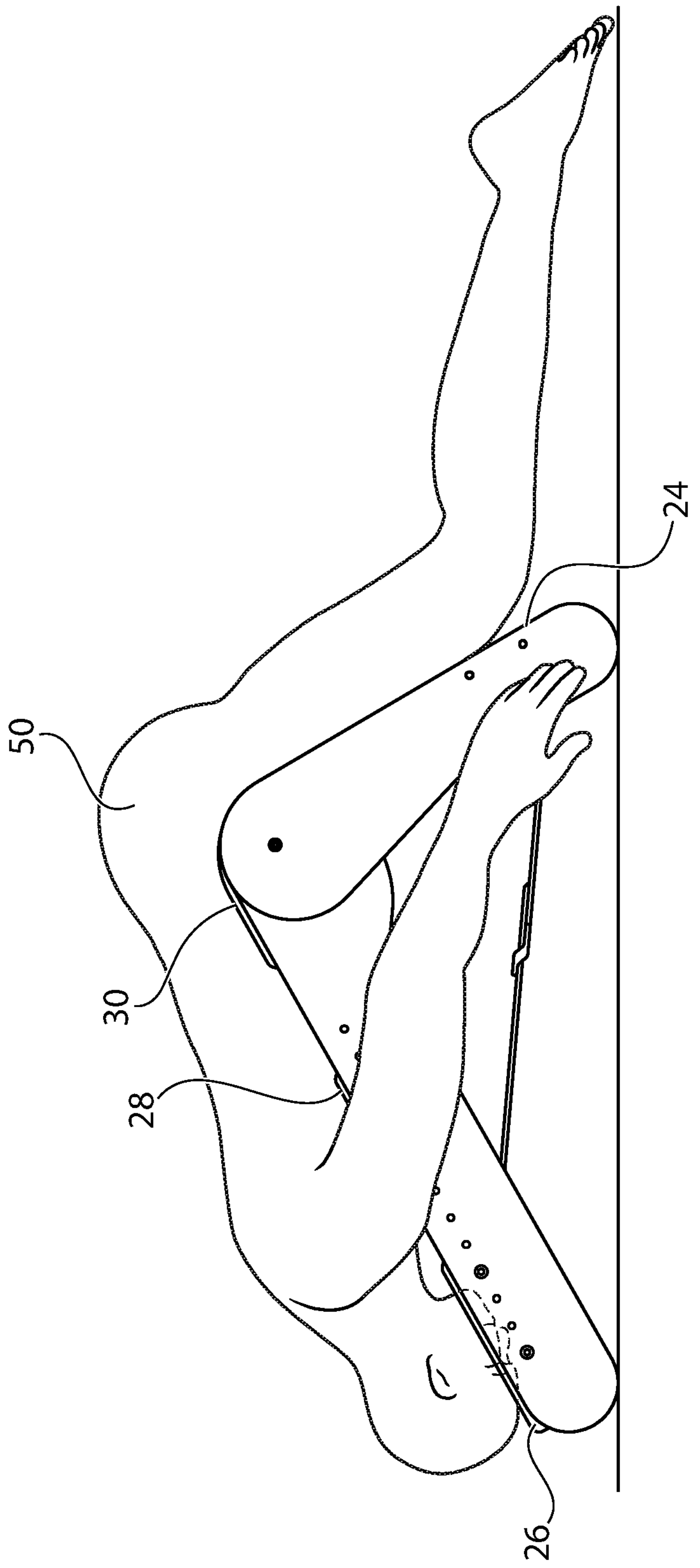
FIG. 5 is a plan view showing how the spine elongation device is used according to an embodiment of the invention.

FIG. 5 shows an example of the intended use of the passive spine elongation device of the present invention. As shown, once the user has positioned themselves on the device, the user's head is positioned in the hole in the head support 26, while their pelvis is positioned on the pelvic support 30 such that their hips simply bend and the legs rest on leg support 24. The user's chest or upper torso is positioned on the torso support 28 such that any portion of their stomach/gut falls in the space 15 between the pelvic support 30 and the torso support 28.

According to an implementation, gentle flexion of the lower back followed by relaxation will stretch the muscles and promote passive elongation of the lower back vertebrae. The position of the person (face-down or prone), the weight of the user's torso and the contact points above the anterior iliac crests will cause the passive elongation of the lumbar spine and its muscles, tendons, ligaments and joints.

One example of how to use the spine elongation device of the invention is herein described. For optimal results, the lower back should be warmed with a heating pad or moist towel, or by showering prior to use. As shown, the spine elongation device should be used while lying in the prone position (or face down). It is recommended that the top, front of the pelvic bone (ASIS) 50 is aligned along the apex on the pelvic support 30 as shown. The torso should be slowly lowered onto the front or torso support 28 and the user's face then positioned in the hole in the head support 26. The user's thighs will rest against the leg support 24 with their knees bent enough to allow the feet to rest on the floor in a comfortable position.

Depending on the positioning of the pelvic bone on the apex of the device, a stretch will be felt in different parts of the lumbar spine region. For optimal results, is it recommend that exercises using the spine elongation device of the present invention be performed at least twice a day for 5 minutes at a time. In one example, two minutes into the passive stretch, the user can extend their upper body away from their lower body (approx. 2 cm) while keeping the pelvis in the same place. The readjustment of the body should gently increase the passive stretch to the lumbar spine. After the time (5 minutes) has elapsed, it is recommended to perform slow, gentle range of motion movements in all planes of lower back motion.

The lower back generally has 5 independent segments (lumbar, vertebrae, facet joints and discs) that can benefit from passive elongation and stretch. It is therefore possible to lay on the spine elongation device at different positions from the ASIS to focus the area of passive stretch. For example, positioning the ASIS on the apex wills stretch the lower lumbar and lumbosacral vertebral levels. If the ASIS is positioned more toward the steeper side (real leg support), the stretch will be felt along the upper lumbar region.

While there have been shown, described and pointed out fundamental novel features of the present principles, it will be understood that various omissions, substitutions and changes in the form and details of the methods described and devices illustrated, and in their operation, may be made by those skilled in the art without departing from the spirit of the same. For example, it is expressly intended that all combinations of those elements and/or method steps which perform substantially the same function in substantially the same way to achieve the same results are within the scope of the present principles. Moreover, it should be recognized that structures and/or elements and/or method steps shown and/or described in connection with any disclosed form or implementation of the present principles may be incorporated in any other disclosed, described or suggested form or implementation as a general matter of design choice. It is the intention, therefore, to be limited only as indicated by the scope of the claims appended hereto.

What is claimed is:

1. A portable and foldable passive lumbar spine elongation device comprising:

a front portion having a front length;

a rear portion pivotally connected to the front portion, the rear portion having a rear length, the front length being longer than the rear length;

an apex formed above the point of pivotal connection of the front portion and rear portion, the front portion having opposing legs, a curved pelvic support encompassing the apex, a torso support and a head support positioned between the opposing legs such that when a user is positioned on the device in the prone position, the user's legs touch the ground, the front portion, the rear portion and the apex cooperating with each other to create gentle controlled traction along the lumbar spine using gravity, and an adjustment device connected to the front portion and the rear portion and configured to control pivotal movement of the front portion with respect to the rear portion such that a variable predetermined apex angle is formed between the front portion and the rear portion;

wherein the head support is configured to receive and support a head of a user when the user is positioned on the device, the curved pelvic support and the torso support being separated by a first space, the torso support and the head support being separated by a second space, the first space configured to receive an abdomen of the user.

2. The passive lumbar spine elongation device as claimed in claim 1, wherein the rear portion comprises opposing legs and a leg support connecting the opposing legs.

3. The passive lumbar spine elongation device as claimed in claim 1, wherein the adjustment device comprises a strap having one end connected to the head support of the front portion and an opposing end connected to the rear portion, and a length adjusting portion to enable the strap length to be adjusted.

4. The passive lumbar spine elongation device as claimed in claim 1, wherein the head support includes a hole for receiving a user's face while in a prone position on the device.

5. The passive lumbar spine elongation device as claimed in claim 1, wherein adjusting the length of the strap adjusts a distance between the front portion and the rear portion, and thereby adjusts a height of the apex relative to a surface on which the device is positioned and the variable predetermined apex angle.

6. A portable and foldable passive lumbar spine elongation device comprising:

a front portion having opposing front legs having a length, a curved pelvic support, a torso support and a head support positioned between the opposing legs, the head support being configured to physically contact and support the face of a user, the curved pelvic support and the torso support being separated by a first space, the torso support being separated from the head support by a second space, the first space configured to receive an abdomen of a user;

a rear portion having opposing rear legs having a length and being pivotally connected to the front portion and a leg support connecting the opposing rear legs, the length of the front legs being longer than the length of the rear legs;

an adjustment device having one end connected to the front portion and an opposing end connected to the rear portion, the adjustment device being configured to control and limit the pivotal movement of the front legs with respect to the rear legs such that a variable predetermined apex angle B in a range of 80-100 degrees is formed between the front legs and the rear legs, the front portion, the rear portion and the predetermined apex angle cooperate with each other to create a gentle controlled traction along the lumber spine using gravity;

an angle A at which the front legs contact a ground surface; and an angle C at which the rear legs contact the ground surface, wherein a combined total of angles A and C will be in a range of 100-80 degrees based on the variable apex angle B.

7. The passive lumbar spine elongation device as claimed in claim 6, wherein the adjustment device further comprises a strap and a length adjusting portion to enable the strap length to be adjusted.

8. The passive lumbar spine elongation device as claimed in claim 7, wherein adjusting the length of the strap adjusts a distance between the front legs and the rear legs, and thereby adjusts a height of the apex relative to a surface on which the device is positioned and the variable predetermined apex angle.

9. The passive lumbar spine elongation device as claimed in claim 1, wherein the torso support and head support are adjustable relative to the apex and each other such that the first space and second space are thereby variable to accommodate different body types of different users.

10. The passive lumbar spine elongation device as claimed in claim 6, wherein the torso support and head support are adjustable relative to the curved pelvic support and each other such that the first space and second space are thereby variable to accommodate different body types of different users.

11. The passive lumbar spine elongation device as claimed in claim 1, wherein the torso support and head support are adjustable relative to the curved pelvic support and each other such that the first space and second space are thereby variable to accommodate different body types of different users.

* * * * *